US012617735B2

(12) United States Patent
Setlur et al.

(10) Patent No.: US 12,617,735 B2
(45) Date of Patent: May 5, 2026

(54) METHODS TO REMOVE AN EBC FROM A SUBSTRATE AND TO REPAIR A COATED COMPONENT

(71) Applicant: General Electric Company, Schenectady, NY (US)

(72) Inventors: Anant Achyut Setlur, Niskayuna, NY (US); Julin Wan, Rexford, NY (US); Andrea Vozar, Niskayuna, NY (US); James Edward Murphy, Niskayuna, NY (US)

(73) Assignee: General Electric Company, Evendale, OH (US)

(*) Notice: Subject to any disclaimer, the term of this patent is extended or adjusted under 35 U.S.C. 154(b) by 244 days.

(21) Appl. No.: 18/435,220

(22) Filed: Feb. 7, 2024

(65) Prior Publication Data

US 2025/0250209 A1 Aug. 7, 2025

(51) Int. Cl.
| | |
|---|---|
| *C04B 41/53* | (2006.01) |
| *C04B 35/80* | (2006.01) |
| *C04B 41/50* | (2006.01) |
| *C04B 41/52* | (2006.01) |
| *C04B 41/87* | (2006.01) |

(Continued)

(52) U.S. Cl.
CPC .......... *C04B 41/5353* (2013.01); *C04B 35/80* (2013.01); *C04B 41/5031* (2013.01); *C04B 41/5096* (2013.01); *C04B 41/522* (2013.01); *C04B 41/87* (2013.01); *C04B 41/88* (2013.01);

(Continued)

(58) Field of Classification Search
CPC . C04B 41/5353; C04B 35/80; C04B 41/5031; C04B 41/5096; C04B 41/522; C04B 41/87; C04B 41/88; C04B 41/90; C04B 41/91; C04B 2111/00982; C04B 41/009; C04B 41/5346; C09K 13/08; F05D 2230/80; F05D 2240/11; F05D 2300/6033; F05D 2230/72; F05D 2230/90; F05D 2260/95; F01D 5/282; F01D 5/284;

(Continued)

(56) References Cited

U.S. PATENT DOCUMENTS

| | | | |
|---|---|---|---|
| 4,055,458 A | 10/1977 | Niederpriim et al. |
| 4,517,106 A | 5/1985 | Hopkins et al. |

(Continued)

FOREIGN PATENT DOCUMENTS

| | | | | | |
|---|---|---|---|---|---|
| CN | 117467300 A | * | 1/2024 | ............... | C09D 9/00 |
| FR | 3142473 A1 | | 5/2024 | | |
| WO | WO-2013144022 A1 | * | 10/2013 | ............. | F01D 5/284 |

OTHER PUBLICATIONS

CN-117467300 A English machine translation (Year: 2024).*

*Primary Examiner* — Anita K Alanko
(74) *Attorney, Agent, or Firm* — Dority & Manning, P.A.

(57) ABSTRACT

A method is provided for removing an environmental barrier coating from a coated component. The method may include contacting the coated component with an etchant liquid that comprises 5% by volume to 70% by volume of hydrogen fluoride and a solvent. The hydrogen fluoride reacts with silicon oxide in a thermally grown oxide layer positioned between a bondcoat and the environmental barrier coating. The bondcoat is positioned within the coated component between a silicon-containing substrate and the thermally grown oxide layer, and the bondcoat comprises a silicon-containing material.

20 Claims, 7 Drawing Sheets

(51) Int. Cl.

| | |
|---|---|
| *C04B 41/88* | (2006.01) |
| *C04B 41/90* | (2006.01) |
| *C04B 41/91* | (2006.01) |
| *C09K 13/08* | (2006.01) |

(52) U.S. Cl.
CPC .............. *C04B 41/90* (2013.01); *C04B 41/91* (2013.01); *C09K 13/08* (2013.01); *F05D 2230/80* (2013.01)

(58) Field of Classification Search
CPC ........ F01D 25/007; F01D 5/288; F01D 5/005; F23R 2900/00019
See application file for complete search history.

(56) References Cited

U.S. PATENT DOCUMENTS

| | | | |
|---|---|---|---|
| 4,563,239 | A | 1/1986 | Adinolfi et al. |
| 5,723,078 | A | 3/1998 | Nagaraj et al. |
| 6,274,078 | B1 | 8/2001 | Dunyak et al. |
| 7,371,426 | B2 | 5/2008 | Rigney et al. |
| 7,513,986 | B2 * | 4/2009 | Albrecht ................... C23F 1/02 204/224 R |
| 10,363,584 | B2 | 7/2019 | Weaver et al. |
| 10,414,694 | B2 | 9/2019 | Strock et al. |
| 11,053,578 | B2 | 7/2021 | Fairbourn et al. |
| 11,084,761 | B2 | 8/2021 | Olson et al. |
| 2001/0009246 | A1 * | 7/2001 | Zimmerman, Jr. ...... C23G 1/10 134/1 |
| 2007/0039176 | A1 | 2/2007 | Kelly |
| 2009/0239061 | A1 | 9/2009 | Hazel et al. |
| 2010/0279018 | A1 | 11/2010 | Hazel et al. |
| 2017/0101348 | A1 * | 4/2017 | Wan .................... C04B 41/5062 |
| 2022/0098122 | A1 | 3/2022 | Olson et al. |

* cited by examiner

150

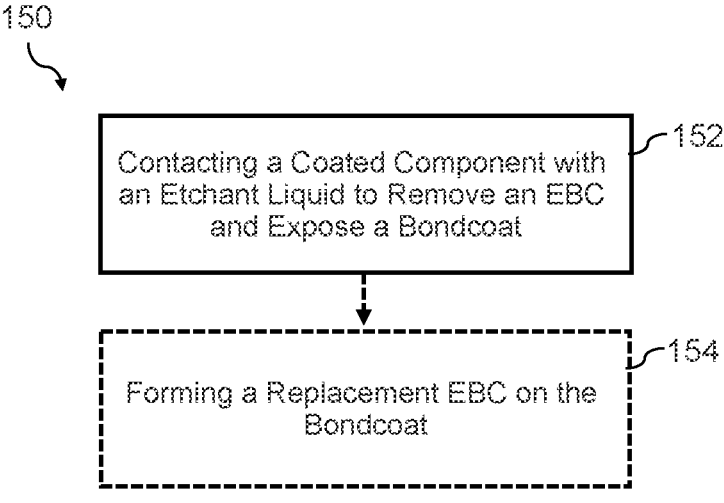

152

Contacting a Coated Component with an Etchant Liquid to Remove an EBC and Expose a Bondcoat

154

Forming a Replacement EBC on the Bondcoat

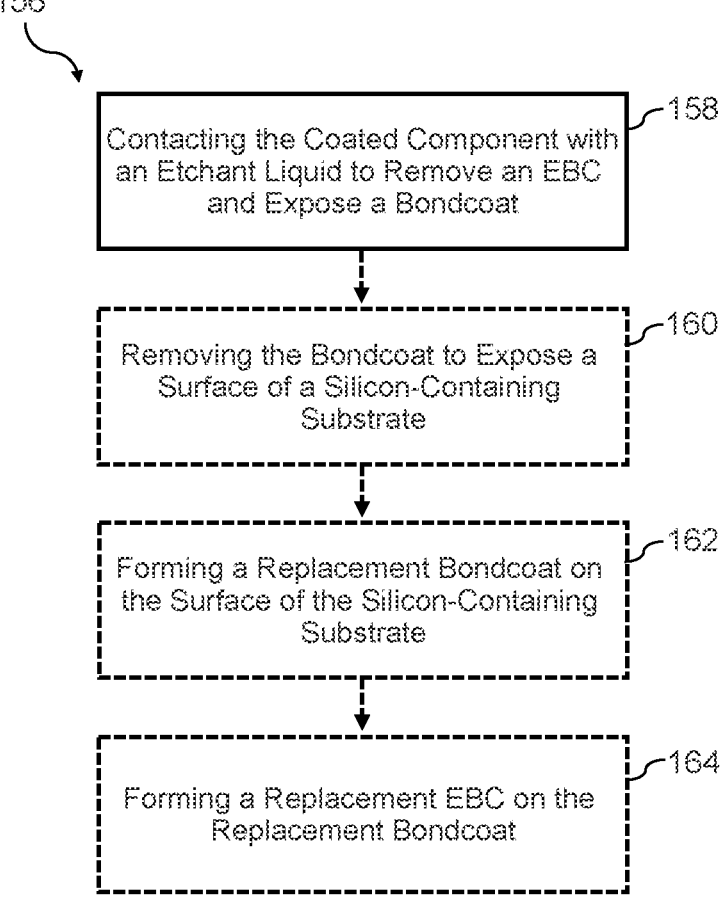

158

Contacting the Coated Component with an Etchant Liquid to Remove an EBC and Expose a Bondcoat

160

Removing the Bondcoat to Expose a Surface of a Silicon-Containing Substrate

162

Forming a Replacement Bondcoat on the Surface of the Silicon-Containing Substrate

164

Forming a Replacement EBC on the Replacement Bondcoat

172
Contacting a Coated Component with an Etchant Liquid to Chemically Weaken a Bondcoat and a EBC on a Substrate 174
Removing the Bondcoat and the EBC from the Silicon-Containing Substrate 176
Forming a Replacement Bondcoat on the Surface of the Silicon-Containing Substrate 178
Forming a Replacement EBC on the Replacement Bondcoat

METHODS TO REMOVE AN EBC FROM A SUBSTRATE AND TO REPAIR A COATED COMPONENT

FIELD

The present disclosure generally relates to methods for removal of an environmental barrier coating layer(s) from a substrate.

BACKGROUND

Silicon-based materials are employed for high temperature components of gas turbine engines such as, for instance, airfoils (e.g., blades, vanes), combustor liners, and shrouds. The silicon-based materials may include silicon-based monolithic ceramic materials, intermetallic materials, and composites. For example, silicon-based ceramic matrix composites (CMCs) may include silicon-containing fibers reinforcing a silicon-containing matrix phase.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which:

FIG. 5A shows a flow chart diagram of an exemplary method for removing an EBC from an exemplary coated component that includes a silicon-containing bondcoat, a thermal barrier coating layer, and an EBC;

FIG. 5B shows a flow chart diagram of an exemplary method for removing an EBC from an exemplary coated component that includes a silicon-containing bondcoat, a thermal barrier coating layer, and an EBC;

Figure 1:
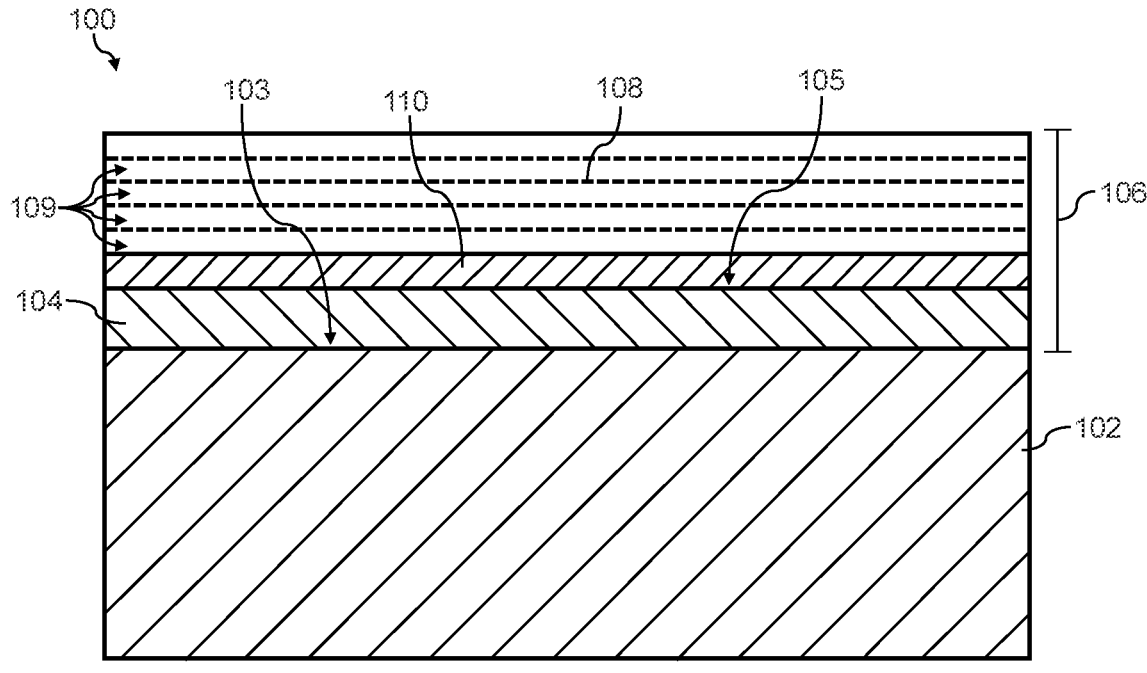
FIG. 1 is a cross-sectional schematic view of an exemplary coated component including a substrate coated with a silicon-containing bondcoat, a thermal barrier coating, and an EBC.

Repeat use of reference characters in the present specification and drawings is intended to represent the same or analogous features or elements of the present disclosure.

Definitions

As used herein, the terms "first", "second", and "third" may be used interchangeably to distinguish one component from another and are not intended to signify location or importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "RE" refers to a rare earth element or a mixture of rare earth elements. More specifically, the "RE" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, "alumina" refers to an aluminum oxide in the form of $Al_2O_3$.

As used herein, "silica" refers to a silicon oxide in the form of $SiO_2$. Conversely, "elemental silicon" refers to silicon without any alloying materials present, outside of incidental impurities. It is sometimes referred to in the art as "silicon metal." Elemental silicon has a melting point of about 1414° C.

As used herein, the term "mullite" generally refers to a mineral containing alumina and silica. That is, mullite is a chemical compound of alumina and silica with an alumina $(Al_2O_3)$ and silica $(SiO_2)$ ratio of about 3 to 2 (e.g., within 10 mole % of 3 to 2 of alumina to silica). However, a ratio of about 2 to 1 has also been reported as mullite (e.g., within 10 mole % of 2 to 1 of alumina to silica).

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al₂O₃), silicon dioxide (SiO₂), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide (Al₂O₃), silicon dioxide (SiO₂), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide (Al₂O₃), silicon dioxide (SiO₂), aluminosilicates, and mixtures thereof. Aluminosilicates can include crystalline materials such as mullite (3Al₂O₃ 2SiO₂), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As used herein, environmental-barrier-coating or "EBCs" refers to a coating system comprising one or more layers of ceramic materials, each of which provides specific or multifunctional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., comprising barium-strontium-aluminum silicate (BSAS), such as having a range of compositions of BaO, SrO, Al₂O₃, SiO₂, or combinations thereof), hermetic layers (e.g., a rare earth disilicate), outer coatings (e.g., comprising a rare earth monosilicate, such as slurry or APS-deposited yttrium monosilicate (YMS)), or combinations thereof. One or more layers may be doped as desired, and the EBC may also be coated with an abradable coating.

The term "defect" as used herein refers to a portion of the protective layers, substrate, or both exposed to the environment due to damage.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Although silicon-containing substrates exhibit desirable high temperature characteristics, such substrates can suffer from rapid recession in combustion environments. For example, silicon-containing substrates are susceptible to volatilization upon high-temperature exposure to reactive species such as water vapor. In such cases, coatings are used to protect the silicon-containing substrates. Silicon-containing substrates, such as CMCs, may have multiple protective coating layers on its surface, such as a silicon bondcoat, di-silicate EBCs, mono-silicate EBCs, or a combination thereof. These protective layers help to prevent the degradation of silicon-containing substrates in a corrosive water-containing environment by inhibiting the ingress of water vapor and the subsequent formation of volatile products such as silicon hydroxide (e.g., Si(OH)₄). Several additional layers, such as an abradable layer, may also be deposited on the EBC to provide specific functionality to CMC components. Thus, the protective layers may enhance the high temperature environmental stability of silicon-containing substrates. Other desired properties for the EBC include a thermal expansion compatibility with the silicon-containing substrate, low permeability for oxidants, low thermal conductivity, and chemical compatibility with the thermally grown silicon-based oxide.

During service, one or more of these protective layers may suffer from damage, such as in the form of a defect. If an EBC experiences a localized spall or a pinhole defect, the underlying substrate may be subject to material loss resulting from water vapor-induced volatilization and subsequent surface recession during operation. If allowed to grow unmitigated, such material loss may reduce the load-bearing capability of the component, disrupt airflow, or even progress to through-thickness holes, which may adversely affect the operating performance and durability of the machine.

In order to repair a worn or damaged environmental barrier coating, a process for removing any existing environmental barrier coating is desired to produce a refreshed surface on the substrate for the formation of a replacement bondcoat, a replacement environmental barrier coating, or both.

Methods are generally provided for removing an environmental barrier coating from a coated component. The method includes contacting the coated component with an etchant liquid, with the etchant liquid comprising hydrogen fluoride and a solvent. The etchant liquid may be further tailored based on the chemistry of layers between the substrate of the coated component and the environmental barrier coating, such as the chemical composition of a bondcoat (and thermally grown oxide layer, if present) therebetween.

Referring to FIG. 1, an exemplary coated component 100 is shown that include a silicon-containing substrate 102 having a surface 103 with a coating system 106 thereon. In one particular embodiment, the silicon-containing substrate 102 is formed from a CMC material. Similarly, referring to FIG. 6, an exemplary coated component 100 is shown that include a silicon-containing substrate 102 having a surface 103 with a coating system 106 thereon. In one particular embodiment, the silicon-containing substrate 102 is formed from a CMC material.

Generally, the coating system 106 includes a bondcoat 104 on the surface 103 of the substrate. In the embodiments shown, the bondcoat 104 is directly on the surface 103 without any layer therebetween. An EBC 108 is over the bondcoat 104. In one embodiment, the bondcoat 104 comprises silicon (e.g., elemental silicon), a silicon-based material (e.g., a silicide), mullite, or a combination thereof. Generally, the bondcoat 104 is relatively thin, such as having a thickness that is 25 micrometers (μm) to 275 μm, such as as 25 μm to 150 μm (e.g., 25 μm to 100).

The EBC 108 may include a plurality of individual EBC layers 109, with each of the individual EBC layers 109 being formed of materials selected from typical EBC or thermal barrier coating ("TBC") layer chemistries, including but not limited to rare earth silicates (e.g., mono-silicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc. For example, one individual EBC layer 109 may be include hafnia (e.g., a hafnia layer), alumina (e.g., an alumina layer), or both. Alternatively or additionally, the EBC may include one or more rare earth silicate layers (e.g., a rare earth disilicate layer, a rare earth monosilicate layer, or both). In one particular embodiment, the EBC 108 may include a hermetic layer.

As stated above, the method of removal of the EBC 108 may be tailored depending on the composition of the bond-coat 104 (and thermally grown oxide layer, if present). Suitable methods of removing the EBC 108 are generally provided in the following description, with the methods tailored to the particular chemical composition of the coating system 106 (e.g., the type of bondcoat 104).

I. Coated Components with a Silicon-Containing Bondcoat

In the embodiment of FIG. 1, by way of non-limiting example, the bondcoat 104 comprises a silicon-containing material, such as elemental silicon, a silicide, or a combination thereof. For example, the bondcoat 104 may comprise at least 75% by weight of elemental silicon. This may include at least 95% by weight of elemental silicon. In one embodiment, the bondcoat 104 may consist essentially of elemental silicon, so as to be substantially free from any other material. In other embodiments, the bondcoat 104 may include at least 75% by weight of elemental silicon (e.g., at least 95% by weight of elemental silicon), with the balance being another bondcoat material (e.g., a silicide).

When the bondcoat 104 comprises a silicon-containing material, a thermally grown oxide ("TGO") layer 110 is present on the surface 105 of the bondcoat 104 as shown in FIG. 1. Thus, the bondcoat 104 and the TGO layer 110 are between the silicon-containing substrate 102 and the EBC 108. The TGO layer 110 may form on the surface 105 of the bondcoat 104 when silicon in the bondcoat 104 oxidizes upon exposure to air. For example, the TGO layer 110 may be a layer of silicon oxide (sometimes referred to as "silicon oxide scale" or "silica scale"), during exposure to oxygen (e.g., during manufacturing and/or use) of the coated component 100.

Figure 2:
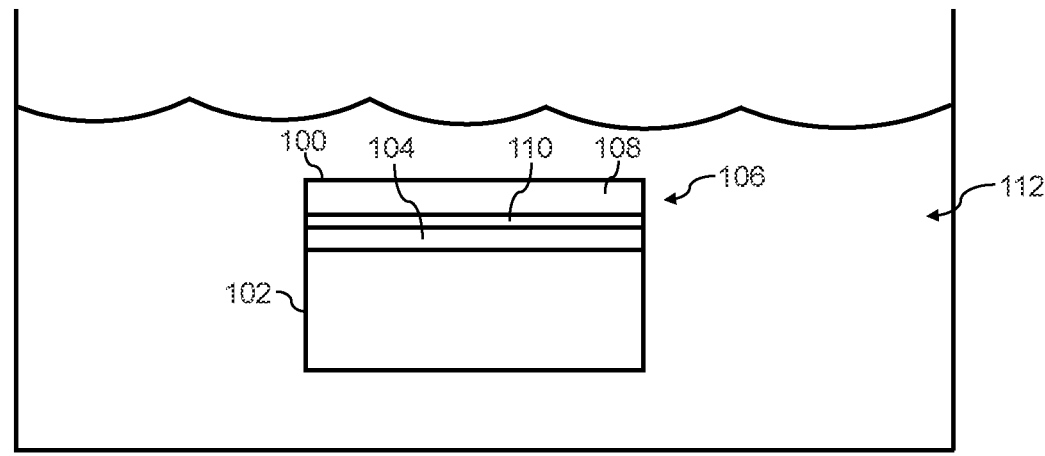
FIG. 2 shows the exemplary coated component of FIG. 1 submerged within an etchant liquid according to one embodiment of a method described herein.

When a TGO layer 110 is present, the coated component 100 may be contacted with an etchant liquid 112, as shown in FIG. 2, that includes 5% by volume to 70% by volume of hydrogen fluoride and a solvent. In particular embodiments, the etchant liquid 112 comprises 25% by volume to 49% by volume of the hydrogen fluoride so as to be a commercial grade of a hydrogen fluoride solution that is readily available. Generally, the hydrogen fluoride reacts with silicon oxide in the TGO layer 110. This reaction weakens the chemical bonds in the TGO layer 110, causing the TGO layer 110 and any overlying layers (i.e., the EBC 108 in the embodiment shown) to be removed from the surface 105 of the bondcoat 104. Conversely, the hydrogen fluoride does not react with the underlying bondcoat 104 nor the substrate 102, which both are silicon-containing. That is, the bondcoat 104 is not removed from the surface 103 of the substrate 102.

In one particular embodiment, the solvent within the etchant liquid 112 is water. For example, the etchant liquid 112 may consist essentially of hydrogen fluoride in water so that no other compositions are present therein other than unavoidable trace amounts. Alternatively, the etchant liquid 112 may further include another acid (e.g., hydrogen chloride, nitric acid, fluorosilicic acid ($H_2SiF_6$), hydrogen peroxide, or mixtures thereof), a wetting agent, etc.

For example, a second acid may be present up to 5% by volume (e.g., 0.1 to 5% by volume) in the etchant liquid 112. In one embodiment, the second acid may be nitric acid added to the HF, depending on the type of silicon-containing substrate 102 as nitric acid would also etch out and remove any elemental Si in the silicon-containing substrate 102. For instance, a silicon-containing substrate 102 formed of a chemical vapor infiltrated (CVI) CMC or a polymer infiltration pyrolysis (PIP) CMC is substantially free from any elemental Si. Thus, nitric acid could be used to remove a bondcoat 104 over a silicon-containing substrate 102 that is a CVI CMC. In an alternative embodiment, where elemental Si is present in the silicon-containing substrate 102 (e.g., a melt infiltrated (MI) CMC), the etchant liquid 112 may be free from nitric acid to avoid etching of the elemental Si in the silicon-containing substrate 102.

When present, the wetting agent may contain fluorine, such as a perfluoralkane sulfonic acid quaternary ammonium salt, a perfluoralkane carboxylic acid salt, an alkoxylation product of a perfluoralkane sulfonamide, or the like. The wetting agent may be present up to 5% by volume (e.g., 0.1 to 5% by volume).

The coated component 100 may be contacted with the etchant liquid 112 having a treatment temperature of 20° C. to 60° C. so as to remain in a liquid state during the chemical etch of the TGO layer 110. As shown in FIG. 2, the coated component 100 may be submerged with the etchant liquid 112.

Figure 3A:
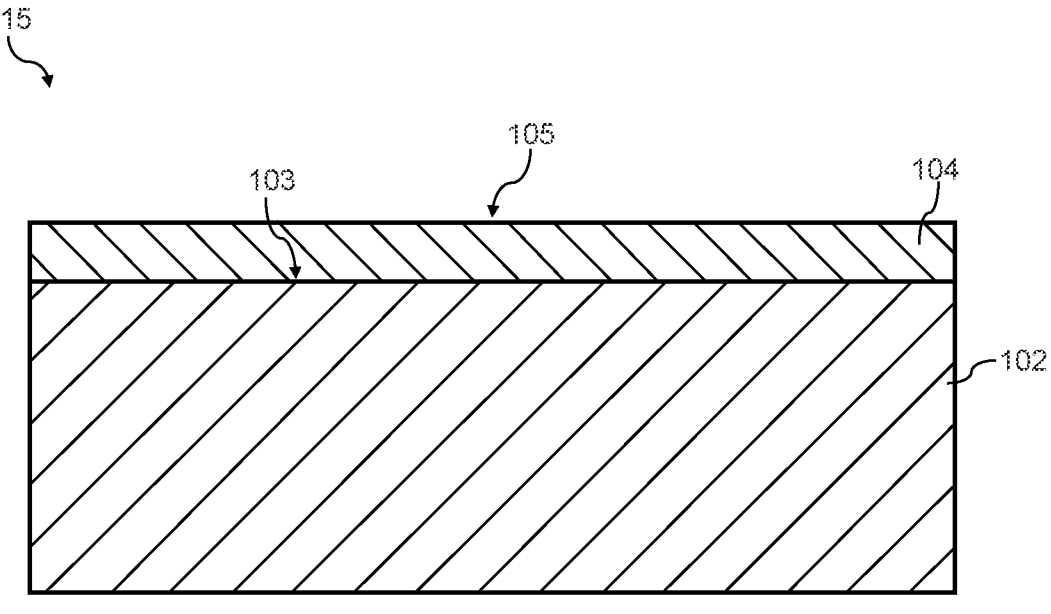
FIG. 3A shows a cross-sectional schematic view of the exemplary coated component of FIG. 1 after removal from the etchant liquid and showing that the silicon-containing bondcoat remains on the substrate while the thermal barrier coating and the EBC are removed.

As shown in FIG. 3A, an intermediate component 115 is formed after removal from the etchant liquid 112 (FIG. 2). By way of a non-limiting example, the etchant liquid 112 may be washed with a rinsing fluid (e.g., water, alcohols, acetone, or the like), the intermediate component 115 may be heated at a drying temperature (e.g., 30° C. to 80° C.) under vacuum or flowing inert gas to volatilize the rinsing fluid, or both washing and heating may be performed. The intermediate component 115 has an exposed surface 105 of the bondcoat 104 on a silicon-containing substrate 102 with the TGO layer 110 and the EBC 108 (FIG. 1) having been removed therefrom. This intermediate component 115 may then be transformed into a repaired component by formation of a new, replacement EBC on the exposed surface 105 of the bondcoat 104. In one embodiment, the exposed surface 105 of the bondcoat 104 of FIG. 3A may form a replacement TGO layer upon exposure to oxygen (air).

Figure 4A:
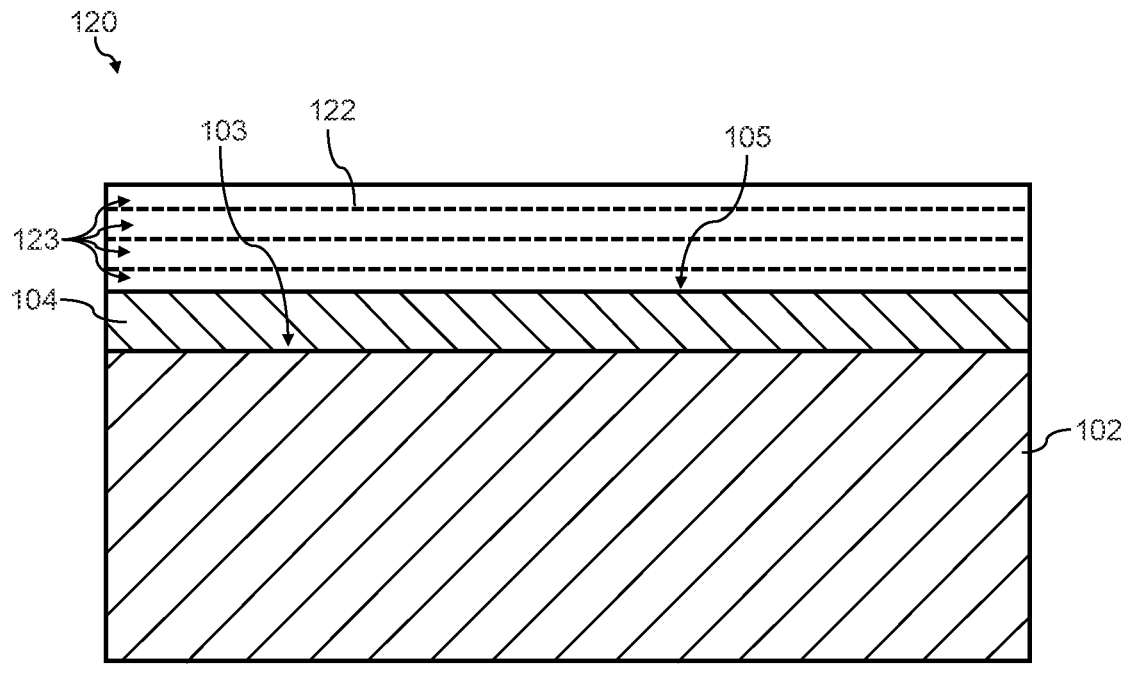
FIG. 4A shows a cross-sectional schematic view of an exemplary repaired component with a replacement environmental barrier coating on the remaining silicon-containing bondcoat of FIG. 3A.

Referring to FIG. 4A, a repaired component 120 is shown having a replacement EBC 122 formed on the intermediate component 115 of FIG. 3A. As shown, the replacement EBC 122 includes a plurality of individual layers 123. The replacement EBC 122, along with the individual layers 123, may be similar or different to the original EBC 108 (FIG. 1) in composition, thickness, layering order, or other variables, as desired. The replacement EBC 122 may be formed according to any suitable method.

FIG. 5A shows a diagram of a method 150 for removing an EBC from a coated component, such as shown in FIG. 1 The method 150 generally includes, at 152, contacting the coated component with an etchant liquid, such as shown in FIG. 2, to remove the EBC and expose a bondcoat. Thus, the step 152 may form the intermediate component 115 of FIG. 3A. Optionally, at 154, a replacement EBC, such as the replacement EBC 122 shown in FIG. 4A, may be formed on the exposed bondcoat to form a repaired component, such as the repaired component 120 shown in FIG. 4A.

Figure 3B:
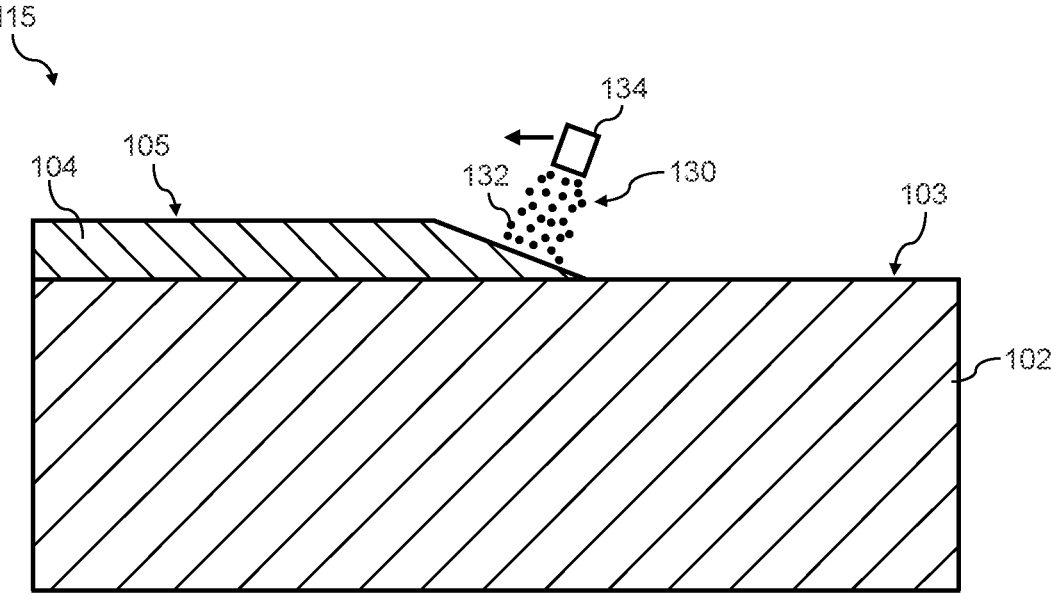
FIG. 3B shows a cross-sectional schematic view of an optional removal of the remaining silicon-containing bondcoat of the component in FIG. 3A.

In another embodiment, the bondcoat 104 may be removed from the intermediate component 115 (FIG. 3A) prior to forming replacement layers thereon. Referring to FIG. 3B, the bondcoat 104 is shown being removed. More specifically, a mechanical etchant 130 is illustrated as contacting with the intermediate component 115 to remove the bondcoat 104 to expose the surface 103 of the silicon-containing substrate 102. By way of a non-limiting example, the bondcoat 104 may be mechanically blasted with a plurality of particles 132 for removal of the bondcoat 104. As shown, the plurality of particles 132 may be sprayed via a spray gun 134 that is moved over the surface 105 of the bondcoat 104 to direct the plurality of particles 132 thereto with sufficient force to remove the bondcoat 104. In certain embodiments, the plurality of particles 132 may be grit particles, glass particles, metal particles, or a mixture thereof. Thus, the surface 103 of the silicon-containing substrate 102 may be exposed after removal of the bondcoat 104.

Figure 4B:
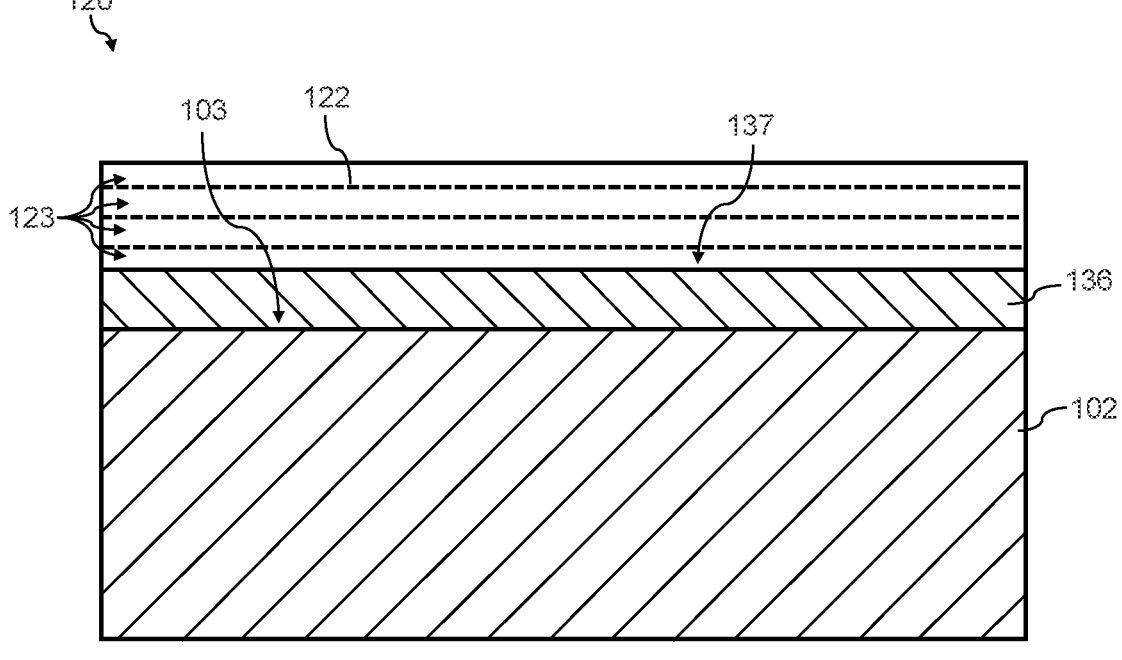
FIG. 4B shows a cross-sectional schematic view of an exemplary repaired component with a replacement environmental barrier coating on a replacement silicon-containing bondcoat.

After removal of the bondcoat 104, a repaired component can be created by formation of a new, replacement bondcoat and a new, replacement EBC on the exposed surface 103 of the silicon-containing substrate 102. Referring to FIG. 4B, a repaired component 120' is shown having a replacement bondcoat 136 and a replacement EBC 122. In the embodiment shown in FIG. 4B, the replacement bondcoat 136 is directly on the surface 103 of the silicon-containing substrate 102, and the replacement EBC 122 is directly on the surface 137 of the replacement bondcoat 136.

The replacement bondcoat 136 may be formed according to any suitable method. The replacement bondcoat 136 may be similar or different as the original bondcoat 104 (FIG. 1) in composition, thickness, or other variables, as desired. For example, the replacement bondcoat 136 may be formed with a silicon-containing material (e.g., elemental silicon, a silicide, etc.), mullite, or a combination thereof. In one embodiment, the replacement bondcoat 136 may comprise mullite (e.g., at least 50% by weight mullite, such as at least 75% by weight mullite) to increase the operating temperature from the original bondcoat 104 of FIG. 1. In such an embodiment, the repaired component 120' may be substantially free from a TGO layer between the replacement bondcoat 136 and the replacement EBC 122.

As discussed above with respect to FIG. 4A, the replacement EBC 122 in the repaired component 120' of FIG. 4B, along with the individual layers 123, may be the same or different as the original EBC 108 (FIG. 1) or may be different in composition, thickness, layering order, or other variables, as desired. The replacement EBC 122 may be formed on a surface 137 of the replacement bondcoat 136 according to any suitable method.

FIG. 5B shows a diagram of a method 156 for removing an EBC and a bondcoat from a coated component, such as shown in FIG. 1. The method 156 generally includes, at 158, contacting the coated component with an etchant liquid, such as shown in FIG. 2, to remove the EBC and expose a bondcoat. Thus, the step 158 may form the intermediate component 115 of FIG. 3A. Optionally, at 160, the bondcoat may be removed to expose a surface of a silicon-containing substrate, such as shown in FIG. 3B. At 162, a replacement bondcoat, such as the replacement bondcoat 136 shown in FIG. 4B, may be optionally formed on the exposed surface of the silicon-containing substrate. At 164, a replacement EBC, such as the replacement EBC 122 shown in FIG. 4B, may be formed on the replacement bondcoat to form a repaired component, such as the repaired component 120' shown in FIG. 4B.

II. Coated Components with a Mullite-Containing Bondcoat

Figure 6:
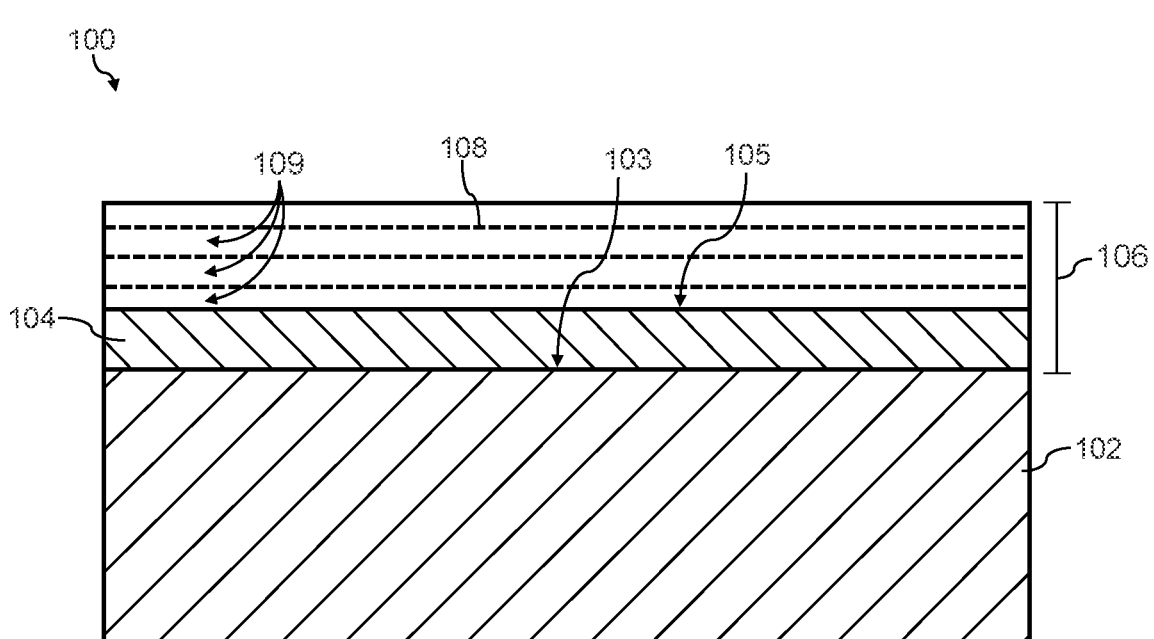
FIG. 6 is a cross-sectional schematic view of an exemplary coated component including a substrate coated with a mullite-containing bondcoat and an EBC.

In the embodiment of FIG. 6, the coating system 106 includes a bondcoat 104 that comprises mullite. For example, the bondcoat 104 may comprise at least 50% by weight of mullite (e.g., at least 75% by weight of mullite). In one embodiment, the bondcoat 104 may consist essentially of mullite, so as to be substantially free from any other material. In other embodiments, the bondcoat 104 may include at least 50% by weight of mullite (e.g., at least 75% by weight of mullite) with the balance being another bondcoat material (e.g., a silicon-containing material, such as described above).

When the bondcoat 104 comprises a mullite, the coated component 100 may be substantially free from any TGO layer on the surface 105 of the bondcoat 104. As such, the EBC 108 may be directly on the surface 105 of the bondcoat 104, as shown in FIG. 6.

Figure 7:
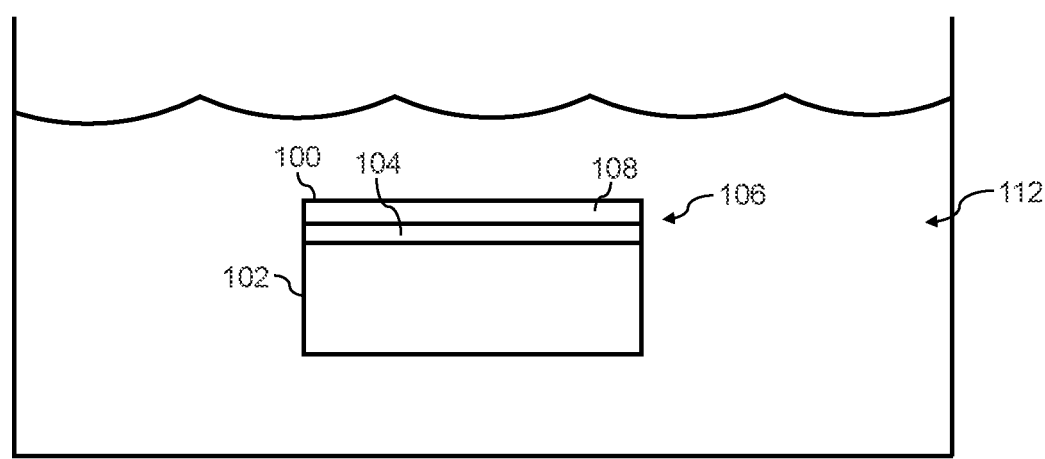
FIG. 7 shows the exemplary coated component of FIG. 6 submerged within an etchant liquid according to one embodiment of a method described herein.

Since the coated component 100 of FIG. 6 is substantially free from any TGO layer, the etchant liquid requires additional components to weaken the chemical bonds between the bondcoat 104 and the EBC 108. Referring to FIG. 7, the coated component 100 may be contacted with an etchant liquid 112 that includes phosphoric acid and 3% by volume to 70% by volume of hydrogen fluoride in a solvent. In particular embodiments, the etchant liquid 112 comprises 5% by volume to 49% (e.g., 25% by volume to 49% by volume) of the hydrogen fluoride so as to be a commercial grade of a hydrogen fluoride solution that is readily available. In addition to hydrogen fluoride, the etchant liquid 112 further includes phosphoric acid to help weaken the chemical bonds of the bondcoat 104, EBC 108, or both. For example, the etchant liquid 112 may include 10% by volume to 60% by volume of the phosphoric acid in an aqueous solution, such as 30% by volume to 40% by volume of the phosphoric acid in an aqueous solution. One example that might be relevant would be to use an etching solution containing about 37% by volume of the phosphoric acid, which may be combined with about 10% by volume hydrogen fluoride in an aqueous solution to etch mullite. The rate of etch may be controlled by selecting the concentration of the hydrogen fluoride and the phosphoric acid, as lower concentrations within the solvent may slow the etch rate and higher concentrations may increase the etch rate.

Generally, the hydrogen fluoride and phosphoric acid reacts with mullite in the bondcoat 104, the material in at least one layer of the EBC 108, or both. This reaction weakens the chemical bonds in the bondcoat 104, the EBC 108, or both, leading to either removal of the bondcoat 104 or allowing for easier removal in subsequent etching. Conversely, the hydrogen fluoride and phosphoric acid does not react with the underlying silicon-containing substrate 102.

In one particular embodiment, the solvent within the etchant liquid 112 is water. For example, the etchant liquid 112 may consist essentially of hydrogen fluoride and phosphoric acid in water so that no other compositions are present therein other than unavoidable trace amounts. Alternatively, the etchant liquid 112 may further include another acid (e.g., hydrogen chloride, nitric acid, fluorosilicic acid ($H_2SiF_6$), hydrogen peroxide, or mixtures thereof), a wetting agent, etc.

For example, a third acid may be present up to 5% by (e.g., 0.1 to 5% by volume). in the etchant liquid 112. In one embodiment, the third acid may be nitric acid added to the HF, depending on the type of silicon-containing substrate 102 as nitric acid would also etch out and remove any elemental Si in the silicon-containing substrate 102. For instance, a silicon-containing substrate 102 formed of a chemical vapor infiltrated (CVI) CMC or a polymer infiltration pyrolysis (PIP) CMC is substantially free from any elemental Si. Thus, nitric acid could be used to remove a bondcoat 104 over a silicon-containing substrate 102 that is a CVI CMC. In an alternative embodiment, where elemental Si is present in the silicon-containing substrate 102 (e.g., a melt infiltrated (MI) CMC), the etchant liquid 112 may be free from nitric acid to avoid etching of the elemental Si in the silicon-containing substrate 102.

Additionally or alternatively, when present the wetting agent may contain fluorine, such as a perfluoralkane sulfonic acid quaternary ammonium salt, a perfluoralkane carboxylic acid salt, an alkoxylation product of a perfluoralkane sulfonamide, or the like. The wetting agent may be present up to 5% by volume (e.g., 0.1 to 5% by volume).

The coated component 100 may be contacted with the etchant liquid 112 having a treatment temperature of 20° C. to 60° C. so as to remain in a liquid state during the chemical etch. As shown in FIG. 7, the coated component 100 may be submerged with the etchant liquid 112.

Figure 8:
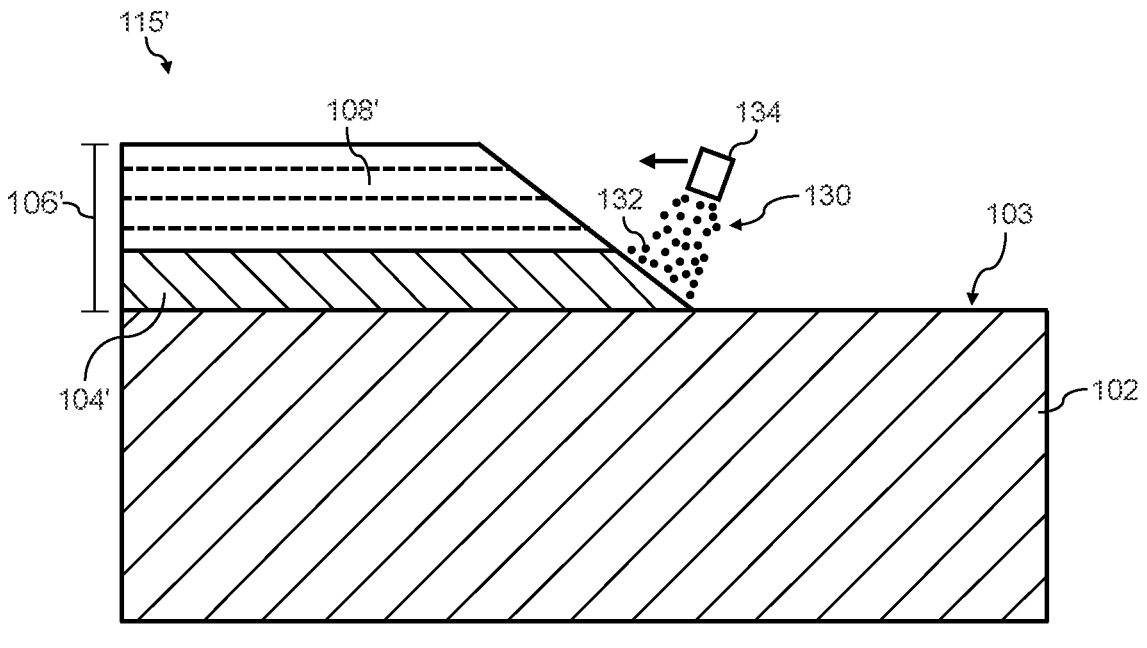
FIG. 8 shows a cross-sectional schematic view an optional method of removing the remaining mullite-containing bondcoat after contact with the etchant liquid.

After removal from the etchant liquid, the resulting intermediate component 115' shown in FIG. 8, includes the chemically-weakened bondcoat 104' and the chemically-weakened EBC 108'. Then, as shown in FIG. 8, the chemically-weakened bondcoat 104' and the chemically-weakened EBC 108' (together defining a chemically-weakened coating 106') may be removed from the intermediate component 115' (FIG. 8) prior to forming replacement layers thereon. Referring to FIG. 8, the chemically-weakened bondcoat 104' and the chemically-weakened EBC 108' are shown being removed via a mechanical etchant 130 being contacted with the intermediate component 115' to remove the chemically-weakened bondcoat 104' to expose the surface 103 of the silicon-containing substrate 102. For example, the chemically-weakened bondcoat 104' may be mechanically blasted with a plurality of particles 132 for removal of the chemically-weakened bondcoat 104'. As shown, the plurality of particles 132 may be sprayed via a spray gun 134 that is moved over the chemically-weakened bondcoat 104' and the chemically-weakened EBC 108' to direct the plurality of particles 132 thereto with sufficient force to remove the chemically-weakened bondcoat 104' and the chemically-weakened EBC 108'. In certain embodiments, the plurality of particles 132 may be grit particles, glass particles, metal particles, or a mixture thereof. Thus, the surface 103 of the silicon-containing substrate 102 may be exposed after removal of the chemically-weakened bondcoat 104' and the chemically-weakened EBC 108'. This intermediate component 115' may then be transformed into a repaired component by formation of a new, replacement bondcoat and a new, replacement EBC on the exposed surface 103 of the silicon-containing substrate 102.

Figure 9:
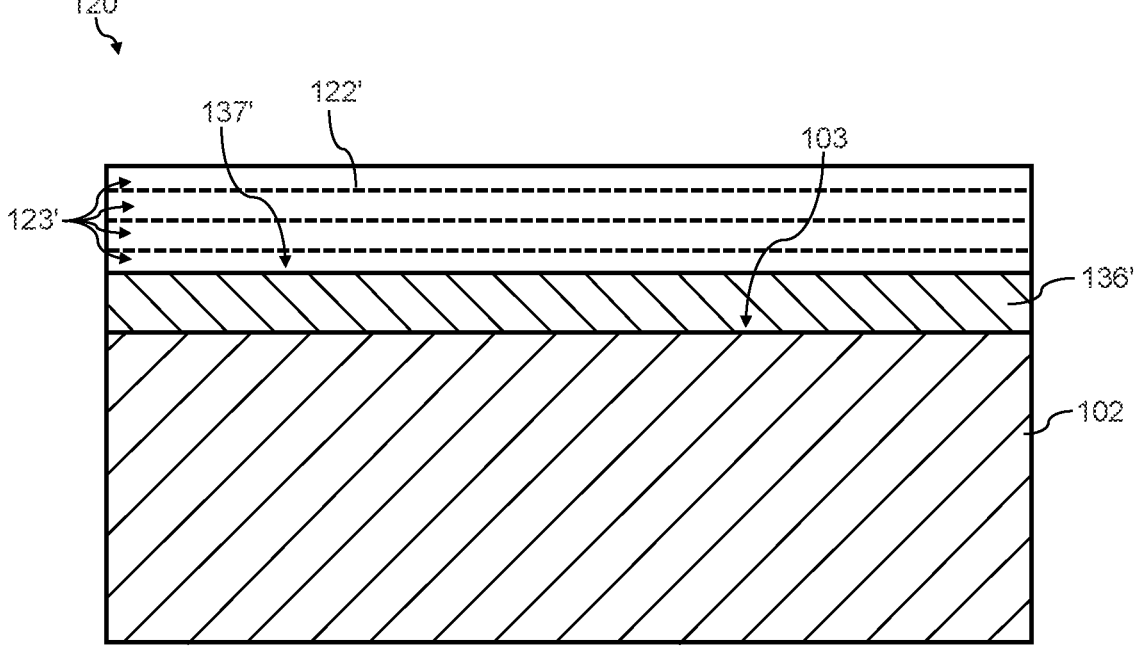
FIG. 9 shows an exemplary repaired component with a replacement environmental barrier coating on the remaining silicon-containing bondcoat.

Referring to FIG. 9, a repaired component 120" is shown having a replacement bondcoat 136' and a replacement EBC 122' formed on the intermediate component 115' of FIG. 8 after removal of the chemically-weakened bondcoat 104' and EBC 108' (FIG. 8). In the embodiment shown in FIG. 9, the replacement bondcoat 136' is directly on the surface 103 of the silicon-containing substrate 102, and the replacement EBC 122' is directly on the surface 137' of the replacement bondcoat 136'.

The replacement bondcoat 136' may be formed according to any suitable method. The replacement bondcoat 136' may be the same or different as the original bondcoat 104 (FIG. 6) or may be different in composition, thickness, or other variables, as desired. For example, the replacement bondcoat 136' may be formed with a silicon-containing material (e.g., elemental silicon, a silicide, etc.), mullite, or a combination thereof. In one embodiment, the replacement bondcoat 136' may comprise mullite (e.g., at least 50% by weight mullite, such as at least 75% by weight mullite). In such an embodiment, the repaired component 120" may be substantially free from a TGO layer between the replacement bondcoat 136' and the replacement EBC 122'.

The replacement EBC 122' in the repaired component 120" of FIG. 9, along with the individual layers 123', may be the same or different as the original EBC 108 (FIG. 6) or may be different in composition, thickness, layering order, or other variables, as desired. The replacement EBC 122' may be formed on a surface 137' of the replacement bondcoat 136' according to any suitable method.

Figure 10:
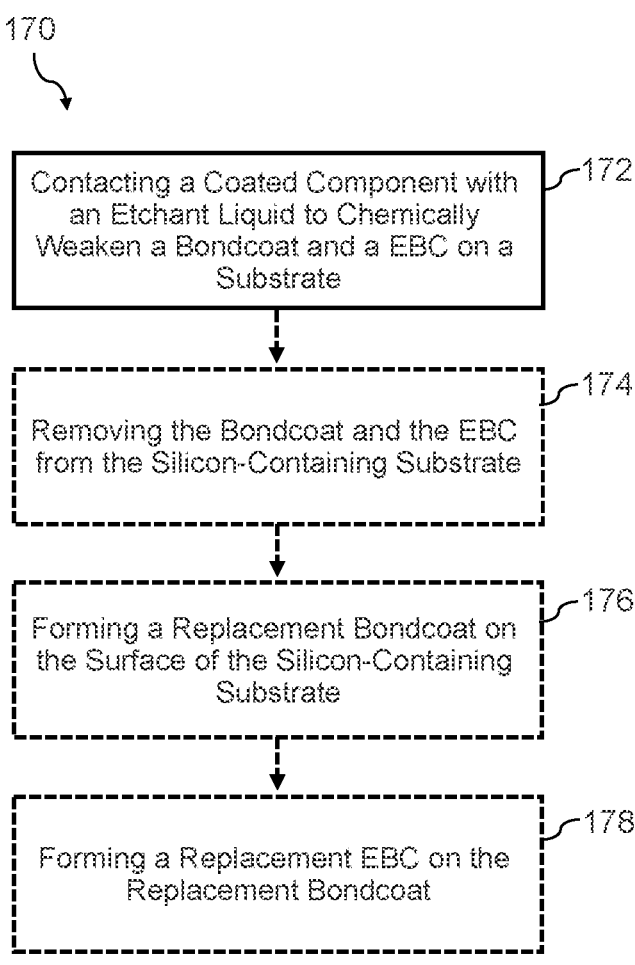
FIG. 10 shows a method of removing an EBC from an exemplary coated component that includes a mullite-containing bondcoat and a thermal barrier coating.

FIG. 10 shows a diagram of a method 170 for removing a bondcoat and an EBC from a coated component, such as shown in FIG. 6. The method 170 generally includes, at 172, contacting the coated component with an etchant liquid, such as shown in FIG. 7, to chemically weaken a bondcoat and a EBC on a substrate. Thus, the step 172 may form the intermediate component 115' of FIG. 8. Optionally, at 174, the weakened bondcoat and the weakened EBC may be removed to expose a surface of the silicon-containing substrate, such as shown in FIG. 8. At 176, a replacement bondcoat, such as the replacement bondcoat 136' shown in FIG. 9, may be optionally formed on the exposed surface of the silicon-containing substrate. At 178, a replacement EBC, such as the replacement EBC 122' shown in FIG. 9, may be formed on the replacement bondcoat to form a repaired component, such as the repaired component 120" shown in FIG. 9.

In any of the above embodiments, after removal of the EBC 108, the resulting intermediate component may be refurbished for use as a repaired component. Such repaired components may be particularly suitable for use as component found in high temperature environments, such as those present in gas turbine engines, for example, combustor components, turbine blades, shrouds, nozzles, heat shields, and vanes. In particular, the repaired components may be a repaired CMC component positioned within a hot gas flow path of the gas turbine such that the repaired coating system forms a repaired EBC for the underlying substrate to protect the repaired component within the gas turbine when exposed to the hot gas flow path. In certain embodiments, the repaired bondcoat is configured such that the repaired component is exposed to operating temperatures of about 1475° C. to about 1650° C., while the repaired bondcoat remains substantially unaffected by these operating temperatures. Thus, repaired bondcoat may withstand exposure to operating temperatures of about 1475° C. to about 1650° C.

Further aspects of this disclosure are provided by the subject matter of the following clauses:

A method for removing an environmental barrier coating from a coated component that includes a silicon-containing substrate, a bondcoat on the silicon-containing substrate and comprising a silicon-containing material, an environmental barrier coating on the bondcoat, and a thermally grown oxide layer positioned between the bondcoat and the environmental barrier coating, the method comprising: contacting the coated component with an etchant liquid comprising 5% by volume to 70% by volume of hydrogen fluoride and a solvent, wherein the hydrogen fluoride reacts with silicon oxide in the thermally grown oxide layer to thereby remove the thermally grown oxide layer and the environmental barrier coating from the bondcoat.

The method of any preceding clause, wherein the bondcoat comprises elemental silicon.

The method of any preceding clause, wherein the bondcoat comprises at least 75% by weight of elemental silicon.

The method of any preceding clause, wherein contacting the coated component with the etchant liquid comprises submerging the coated component within the etchant liquid.

The method of any preceding clause, wherein the etchant liquid comprises 25% by volume to 49% by volume of the hydrogen fluoride.

The method of any preceding clause, wherein the solvent comprises water.

The method of any preceding clause, wherein the etchant liquid consists essentially of the hydrogen fluoride and water.

The method of any preceding clause, wherein the etchant liquid further comprises hydrogen chloride, nitric acid, fluorosilicic acid, hydrogen peroxide, or mixtures thereof.

The method of any preceding clause, wherein the etchant liquid further comprises a wetting agent.

The method of any preceding clause, wherein contacting the coated component with the etchant liquid having a treatment temperature of 20° C. to 60° C.

The method of any preceding clause, further comprising: after contacting the coated component with the etchant liquid, removing the bondcoat to expose a surface of the silicon-containing substrate.

The method of any preceding clause, wherein removing the bondcoat from the substrate comprises contacting the coated component with a mechanical etchant to remove the bondcoat and expose a surface of the silicon-containing substrate.

The method of any preceding clause, wherein contacting the coated component with the mechanical etchant comprises mechanically blasting the bondcoat with a plurality of particles for removal of the bondcoat.

The method of any preceding clause, wherein the plurality of particles comprises grit particles, glass particles, metal particles, or a mixture thereof.

A method of repairing a coated component, the method comprising: forming an intermediate component by removing an environmental barrier coating from the coated component according to the method of any preceding clause to expose the bondcoat and define an exposed bondcoat; forming a replacement environmental barrier coating on the intermediate component.

The method of any preceding clause, wherein the replacement environmental barrier coating is formed directly on the exposed bondcoat.

The method of any preceding clause, further comprising: after exposing the bondcoat, removing the bondcoat to expose a surface of the silicon-containing substrate to define an exposed silicon-containing substrate; and forming a replacement bondcoat on the exposed silicon-containing substrate, wherein the replacement environmental barrier coating is formed on the replacement bondcoat.

The method of any preceding clause, wherein removing the bondcoat comprises contacting the intermediate component with a mechanical etchant.

The method of any preceding clause, wherein contacting the intermediate component with the mechanical etchant comprises mechanically blasting the bondcoat with a plurality of particles.

The method of any preceding clause, wherein the replacement bondcoat comprises mullite.

A method for removing a coating from a coated component, the method comprising: contacting the coated component with an etchant liquid, wherein the etchant liquid comprises phosphoric acid, 5% by volume to 70% by volume of hydrogen fluoride, and a solvent, wherein the coated component includes a coating on a silicon-containing substrate, the coating comprising a bondcoat and an environmental barrier coating, wherein the bondcoat comprises mullite, and wherein the phosphoric acid and the hydrogen fluoride react with the coating to weaken chemical bonds therein to form a chemically-weakened coating, and removing the chemically-weakened coating from the silicon-containing substrate.

The method of any preceding clause, wherein the bondcoat comprises at least 50% by weight mullite.

The method of any preceding clause, wherein the bondcoat comprises at least 75% by weight mullite.

The method of any preceding clause, wherein the environmental barrier coating is directly on the bondcoat prior to contacting the coated component with an etchant liquid.

The method of any preceding clause, wherein the coated component is substantially free of a thermally grown oxide layer.

The method of any preceding clause, wherein contacting the coated component with the etchant liquid comprises submerging the coated component within the etchant liquid.

The method of any preceding clause, wherein the etchant liquid comprises 25% by volume to 49% by volume of the hydrogen fluoride.

The method of any preceding clause, wherein the etchant liquid comprises 10% by volume to 60% by volume of the phosphoric acid.

The method of any preceding clause, wherein the etchant liquid comprises 30% by volume to 40% by volume of the phosphoric acid.

The method of any preceding clause, wherein the solvent comprises water.

The method of any preceding clause, wherein the etchant liquid consists essentially of the hydrogen fluoride, the phosphoric acid, and water.

The method of any preceding clause, wherein the etchant liquid further comprises hydrogen chloride, nitric acid, fluorosilicic acid, hydrogen peroxide, or a mixture thereof.

The method of any preceding clause, wherein the etchant liquid further comprises a wetting agent.

The method of any preceding clause, wherein the etchant liquid has a treatment temperature of 20° C. to 60° C. during the contacting.

The method of any preceding clause, wherein removing the chemically-weakened coating from the silicon-containing substrate comprises: contacting the coated component with a mechanical etchant to remove the bondcoat and the environmental barrier coating to expose a surface of a silicon-containing substrate.

The method of any preceding clause, wherein contacting the coated component with the mechanical etchant comprises mechanically blasting the environmental barrier coating and the bondcoat with a plurality of particles for removal of the environmental barrier coating and the bondcoat.

A method of repairing a coated component, the method comprising: forming an intermediate component by removing a bondcoat and an environmental barrier coating from the coated component according to the method of claim 1 to expose the silicon-containing substrate; and forming a replacement bondcoat on the silicon-containing substrate.

The method of any preceding clause, wherein the replacement bondcoat comprises mullite.

The method of any preceding clause, further comprising: forming a replacement environmental barrier coating on the replacement bondcoat.

The method of any preceding clause, wherein the replacement environmental barrier coating is formed directly on the bondcoat without a thermally grown oxide layer therebetween.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for removing an environmental barrier coating from a coated component that includes a silicon-containing substrate, a bondcoat on the silicon-containing substrate and comprising a silicon-containing material, an environmental barrier coating on the bondcoat, and a thermally grown oxide layer positioned between the bondcoat and the environmental barrier coating, the method comprising:
   contacting the coated component with an etchant liquid comprising 5% by volume to 70% by volume of hydrogen fluoride and a solvent, wherein the hydrogen fluoride reacts with silicon oxide in the thermally grown oxide layer to thereby remove the thermally grown oxide layer and the environmental barrier coating from the bondcoat.

2. The method of claim 1, wherein the bondcoat comprises elemental silicon.

3. The method of claim 1, wherein the bondcoat comprises at least 75% by weight of elemental silicon.

4. The method of claim 1, wherein contacting the coated component with the etchant liquid comprises submerging the coated component within the etchant liquid.

5. The method of claim 1, wherein the etchant liquid comprises 25% by volume to 49% by volume of the hydrogen fluoride.

6. The method of claim 1, wherein the solvent comprises water.

7. The method of claim 6, wherein the etchant liquid consists essentially of the hydrogen fluoride and water.

8. The method of claim 1, wherein the etchant liquid further comprises hydrogen chloride, nitric acid, fluorosilicic acid, hydrogen peroxide, or mixtures thereof.

9. The method of claim 1, wherein the etchant liquid further comprises a wetting agent.

10. The method of claim 1, wherein contacting the coated component with the etchant liquid, with the etchant liquid having a treatment temperature of 20° C. to 60° C.

11. The method of claim 1, further comprising:
   after contacting the coated component with the etchant liquid, removing the bondcoat to expose a surface of the silicon-containing substrate.

12. The method of claim 11, wherein removing the bondcoat from the substrate comprises contacting the coated component with a mechanical etchant to remove the bondcoat and expose a surface of the silicon-containing substrate.

13. The method of claim 12, wherein contacting the coated component with the mechanical etchant comprises mechanically blasting the bondcoat with a plurality of particles for removal of the bondcoat.

14. The method of claim 13, wherein the plurality of particles comprises grit particles, glass particles, metal particles, or a mixture thereof.

15. A method of repairing a coated component, the method comprising:
   forming an intermediate component by removing an environmental barrier coating from the coated component according to the method of claim 1 to expose the bondcoat and define an exposed bondcoat;
   forming a replacement environmental barrier coating on the intermediate component.

16. The method of claim 15, wherein the replacement environmental barrier coating is formed directly on the exposed bondcoat.

17. The method of claim 15, further comprising:
   after exposing the bondcoat, removing the bondcoat to expose a surface of the silicon-containing substrate to define an exposed silicon-containing substrate; and
   forming a replacement bondcoat on the exposed silicon-containing substrate,
   wherein the replacement environmental barrier coating is formed on the replacement bondcoat.

18. The method of claim 17, wherein removing the bondcoat comprises contacting the intermediate component with a mechanical etchant.

19. The method of claim 18, wherein contacting the intermediate component with the mechanical etchant comprises mechanically blasting the bondcoat with a plurality of particles.

20. The method of claim 17, wherein the replacement bondcoat comprises mullite.

* * * * *